United States Patent
Swisher et al.

(10) Patent No.: US 9,585,476 B2
(45) Date of Patent: Mar. 7, 2017

(54) MULTIFUNCTION WORKSTATION

(71) Applicants: Joseph T. Swisher, Franklin, TN (US); Joseph T. Pettigrew, Oalkand, TN (US)

(72) Inventors: Joseph T. Swisher, Franklin, TN (US); Joseph T. Pettigrew, Oalkand, TN (US)

(*) Notice: Subject to any disclaimer, the term of this patent is extended or adjusted under 35 U.S.C. 154(b) by 97 days.

(21) Appl. No.: 14/697,859

(22) Filed: Apr. 28, 2015

(65) Prior Publication Data
US 2016/0318176 A1  Nov. 3, 2016

(51) Int. Cl.
*B25H 3/06* (2006.01)
*A47B 97/00* (2006.01)
*B25H 1/00* (2006.01)
*F16B 1/00* (2006.01)
*A47B 13/16* (2006.01)
*A47B 23/04* (2006.01)

(52) U.S. Cl.
CPC .............. *A47B 97/00* (2013.01); *B25H 3/06* (2013.01); *F16B 1/00* (2013.01); *A47B 13/16* (2013.01); *A47B 23/043* (2013.01); *F16B 2001/0035* (2013.01)

(58) Field of Classification Search
CPC .......... B25H 3/04; B25H 3/06; B25H 1/0021; B25H 1/0042; A47B 97/00; A47B 2200/0066; A47B 23/043; A47B 13/16; F16B 1/00; F16B 2001/0035
See application file for complete search history.

(56) References Cited

U.S. PATENT DOCUMENTS

| | | | | |
|---|---|---|---|---|
| 109,602 A | * | 11/1870 | Evans | A47F 5/0037 211/60.1 |
| 274,087 A | * | 3/1883 | Danner | A47B 49/00 108/105 |
| 727,107 A | * | 5/1903 | Donaldson | A47F 5/02 211/131.1 |
| 770,903 A | * | 9/1904 | Holt | A47B 11/00 108/94 |
| 799,233 A | * | 9/1905 | Hubbell | A47B 49/004 108/105 |
| 929,897 A | * | 8/1909 | Taylor | A47F 5/02 211/70 |
| 1,065,381 A | * | 6/1913 | Martin | A47K 1/09 211/166 |
| 1,570,651 A | * | 1/1926 | Topping | A47F 5/04 108/94 |
| 1,900,610 A | * | 3/1933 | Mullins | A47F 5/06 108/1 |
| 2,120,571 A | | 6/1938 | Reichstein et al. | |

(Continued)

FOREIGN PATENT DOCUMENTS

| | | | | |
|---|---|---|---|---|
| DE | 1922116 A1 | * | 11/1970 | A47F 5/04 |
| DE | 3843940 A1 | * | 7/1990 | B25H 3/02 |

(Continued)

*Primary Examiner* — Stanton L Krycinski
(74) *Attorney, Agent, or Firm* — David J. Kreher

(57) ABSTRACT

A linear actuator to provide the moving force for adjustable furniture, such as beds, chairs or tables. The linear actuator includes a drive assembly, rigid arm, and linkage assembly. The rigid arm includes a pusher block with one or more attachment means where the linkage assembly is attached.

18 Claims, 7 Drawing Sheets

(56) References Cited

U.S. PATENT DOCUMENTS

| | | | |
|---|---|---|---|
| 2,244,950 A * | 6/1941 | Jones | A47B 49/004 211/1 |
| 2,289,212 A * | 7/1942 | Rinnela | A43D 117/00 211/131.1 |
| 2,318,081 A * | 5/1943 | Kerry | B25H 3/04 211/131.1 |
| 2,946,456 A * | 7/1960 | Liguori | A47F 7/283 211/77 |
| 3,414,133 A * | 12/1968 | Innocenti | A45B 3/00 135/66 |
| 3,826,378 A * | 7/1974 | Novak | A63C 11/028 211/166 |
| 4,122,956 A | 10/1978 | Hargrove | |
| 4,167,264 A | 9/1979 | Kretzmeir | |
| 4,261,555 A | 4/1981 | Adams | |
| 4,345,526 A * | 8/1982 | Streit | A47F 5/04 108/101 |
| 4,488,497 A | 12/1984 | Bevans | |
| 4,534,471 A * | 8/1985 | Zahn | B41K 1/58 211/163 |
| 4,549,664 A * | 10/1985 | Gowan | B25H 3/06 206/508 |
| 4,628,580 A * | 12/1986 | Gowan | B25H 3/00 29/428 |
| 4,632,474 A * | 12/1986 | Ingersoll | A47F 7/02 312/125 |
| 4,659,154 A | 4/1987 | Jenkins | |
| 4,678,089 A * | 7/1987 | Lang | A47F 5/06 211/133.4 |
| 4,736,856 A * | 4/1988 | Alneng | A47F 5/05 211/131.1 |
| 5,038,819 A * | 8/1991 | Sutphen | B25H 3/00 137/343 |
| 5,141,211 A | 8/1992 | Adams, Jr. | |
| 5,211,294 A * | 5/1993 | Garman | B44D 3/123 211/70.6 |
| 5,259,601 A | 11/1993 | Vass | |
| 5,335,803 A * | 8/1994 | O'Brien | A47B 13/14 108/50.12 |
| 5,337,904 A * | 8/1994 | Goldberg | A47F 5/04 211/26.1 |
| 5,379,885 A * | 1/1995 | Chen | B25H 3/06 206/216 |
| 5,458,243 A * | 10/1995 | McBride | A47B 57/30 206/503 |
| 5,607,130 A | 3/1997 | Smay et al. | |
| 5,735,413 A * | 4/1998 | Allen | A47B 46/00 211/107 |
| 5,772,050 A * | 6/1998 | Shih | B41K 1/58 211/163 |
| 5,785,304 A | 7/1998 | Little | |
| 5,836,446 A * | 11/1998 | Varnom | B25H 3/06 206/373 |
| 6,105,768 A * | 8/2000 | Brown | B25H 3/025 206/373 |
| 6,142,459 A | 11/2000 | Garrett | |
| 6,206,493 B1 * | 3/2001 | Sanchez-Levin | A47F 5/02 211/131.1 |
| 6,360,891 B1 * | 3/2002 | Rideout | B25H 3/00 206/372 |
| 6,363,865 B1 | 4/2002 | Alcaia et al. | |
| 6,477,966 B1 * | 11/2002 | Petryna | A47B 37/04 108/11 |
| 6,502,707 B1 * | 1/2003 | Sullivan | A47F 7/08 211/144 |
| 6,595,505 B1 | 7/2003 | Loewert | |
| 6,604,737 B1 | 8/2003 | Garrett | |
| D490,848 S * | 6/2004 | Pope | D19/107 |
| 6,837,386 B1 * | 1/2005 | Kent | A47B 96/027 108/151 |
| 6,991,305 B2 * | 1/2006 | Gallea | A47B 57/18 312/238 |
| 7,007,813 B2 * | 3/2006 | Yang | A47G 23/08 108/50.12 |
| 7,144,610 B1 * | 12/2006 | Estes | A47B 97/00 211/128.1 |
| 7,213,951 B2 * | 5/2007 | Cowan | A47B 87/0246 211/153 |
| 7,225,633 B2 * | 6/2007 | DeMars | A47G 23/08 62/371 |
| RE39,917 E * | 11/2007 | Domenig | 211/129.1 |
| 7,584,973 B2 | 9/2009 | Brager | |
| 7,717,277 B2 | 5/2010 | Meinhardt | |
| 7,896,157 B1 * | 3/2011 | Weaver | B25H 3/06 206/223 |
| 7,954,650 B1 * | 6/2011 | Malik | B25H 3/04 211/70.6 |
| 8,051,994 B2 * | 11/2011 | Jin | A01N 1/0242 211/131.1 |
| 8,640,894 B1 * | 2/2014 | Cronin | A47B 97/00 108/183 |
| 8,690,134 B1 | 4/2014 | Saam | |
| 8,720,349 B1 * | 5/2014 | David | A47B 37/04 108/151 |
| 8,915,391 B2 * | 12/2014 | Radow | A47G 19/00 108/139 |
| 8,985,351 B1 * | 3/2015 | Longo | A47F 3/0404 211/13.1 |
| 2002/0190015 A1 * | 12/2002 | Dietrich | B25H 3/04 211/70.6 |
| 2005/0183638 A1 * | 8/2005 | Lin | A47B 96/1425 108/51.11 |
| 2006/0175944 A1 * | 8/2006 | Peters | A47B 88/0451 312/249.11 |
| 2007/0012586 A1 * | 1/2007 | Wang | B25H 3/025 206/379 |
| 2009/0230069 A1 * | 9/2009 | Naden | A47B 49/004 211/144 |
| 2011/0303131 A1 * | 12/2011 | Goode | A47G 19/00 108/101 |
| 2013/0136829 A1 * | 5/2013 | Kandel | A47G 19/00 426/132 |
| 2014/0305348 A1 * | 10/2014 | Vasquez | A47B 13/023 108/23 |

FOREIGN PATENT DOCUMENTS

| | | | | |
|---|---|---|---|---|
| DE | 4015460 A1 * | 11/1991 | | B23Q 3/15526 |
| DE | 19531866 C1 * | 2/1997 | | A47B 49/00 |
| DE | 29708468 U1 * | 7/1997 | | B25H 3/025 |

* cited by examiner

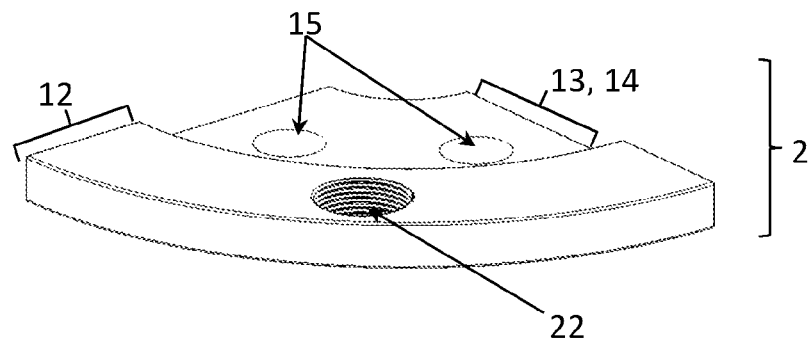
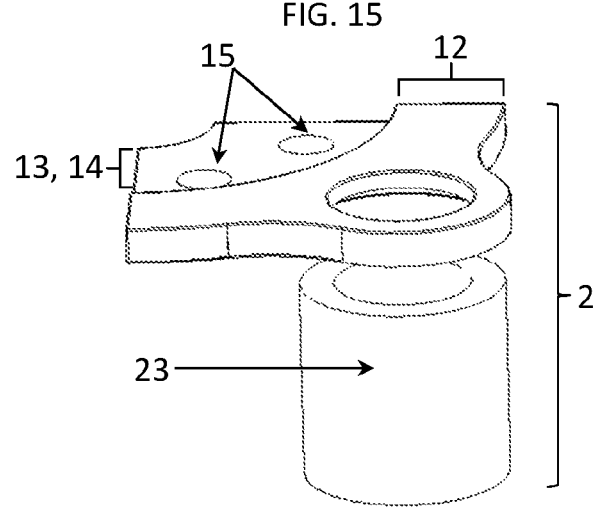
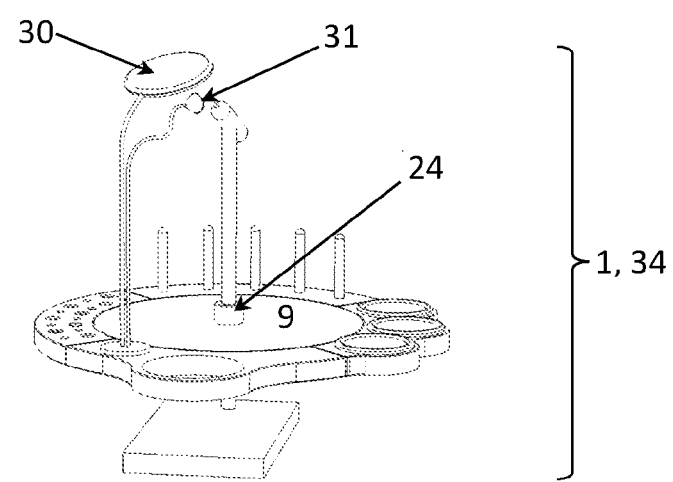

MULTIFUNCTION WORKSTATION

FIELD OF THE INVENTION

The present disclosure reveals a multifunction workstation with a plurality of trays that are magnetically attachable, and with a plurality of tools that are also attachable. Where the plurality of trays are interchangeable depending on the project, and are designed to hold supplies and tools so that they are easily accessible, and where the plurality of tools consist of such items as a magnifying glass, a vice, or a light source, to aid with work.

BACKGROUND OF THE INVENTION

Prior art of multifunction workstation reveal work stations with interchangeable trays but does not reveal where the trays are magnetically attachable to the workstations.

The present disclosure reveals a multifunction workstation with a plurality of trays that are magnetically attachable, and with a plurality of tools that are also attachable. Where the plurality of trays are designed to hold supplies and tools so that they are easily accessible and interchangeable depending on the project and where the plurality of tools consist of such items as a magnifying glass, a vice, or a light source, to aid with work. Several attempts have been made to develop a multifunction workstation but all involve a system distinct from the present disclosure.

In U.S. Pat. No. 8,690,134, Saam, discloses an equipment support rack assembly on wheels, but does not disclose a workstation with trays that are magnetically attached.

In U.S. Pat. No. 7,896,157, Weaver upstanding vertical post with a handle at one end and a base member at the other, with a receptacle between for holding tools and supplies and slots to fit tools into, but does not disclose a workstation with trays that are magnetically attached.

In U.S. Pat. No. 7,717,277, Meinhardt discloses a tool caddy that includes a circular base on a lazy susan bearing, with a collection of slots and compartments for fitting tools and supplies into, but does not disclose a workstation with trays that are magnetically attached.

In U.S. Pat. No. 7,584,973, Brager discloses a portable tool tree on wheels with a locking cover, where once the cover is removed, a collection of levels, each with slots for holding tools, and where the central axle assembly is extendable, but does not disclose a workstation with trays that are magnetically attached.

In U.S. Pat. No. 6,604,737, Garrett discloses a workstation includes an adjustable height, various types of holding and support attachments for the object which is being worked on and which allows the object to be at many different angles, an attached light, and a magnifying glass, but does not disclose a workstation with trays that are magnetically attached.

In U.S. Pat. No. 6,595,505, Loewert discloses a workstation with modular elements for storing components, with a work zone and transfer zone, but does not disclose a workstation with trays that are magnetically attached.

In U.S. Pat. No. 6,363,865, Alcaia et al discloses a mobile art table with room for a work space and storage, but does not disclose a workstation with trays that are magnetically attached.

In U.S. Pat. No. 6,142,459, Garrett discloses a workstation includes an adjustable height, various types of holding and support attachments for the object which is being worked on and which allows the object to be at many different angles, an attached light, and a magnifying glass, but does not disclose a workstation with trays that are magnetically attached.

In U.S. Pat. No. 5,785,304, Little discloses a base assembly comprises a collection of holes for holding tools as well as an attachment for holding a vise that would hold the fly which is being worked on, but does not disclose a workstation with trays that are magnetically attached.

In U.S. Pat. No. 5,607,130, Smay et al discloses a support apparatus for arts and crafts projects comprising a base plate, a vertical dowel with holes into which pegs of various length and utility can be inserted, but does not disclose a workstation with trays that are magnetically attached.

In U.S. Pat. No. 5,259,601, Vass discloses a worktable with an attached viceclamp to allow the user to work on a variety of different equipment and tools, but does not disclose a workstation with trays that are magnetically attached.

In U.S. Pat. No. 5,141,211, Adams, Jr discloses a mobile, adjustable workstation that allows for multiple levels and multiple attachments, but does not disclose a workstation with trays that are magnetically attached.

In U.S. Pat. No. 4,659,154, Jenkins discloses a cabinet with multiple drawers and a flip top for storage and when the flip top is down, the work bench provides a place to work, but does not disclose a workstation with trays that are magnetically attached.

In U.S. Pat. No. 4,488,497, Bevans discloses a mobile tool tray that is adjustable in height, with a single tray, but does not disclose a workstation with trays that are magnetically attached.

In U.S. Pat. No. 4,261,555, Adams discloses a workstation comprises a base plate with a vertical shaft extending from the workstation, with attachable trays for holding supplies and tools, and a work area with a vice feature. Also included is an arm for additional illumination. However, Adams does not disclose a workstation with trays that are magnetically attached In U.S. Pat. No. 4,167,264, Kretzmeir discloses a Comprises a clamp that is attachable to a table. From the clamp, a vertical shaft is extended. Attachable trays can be fit onto the shaft for holding tools, at the top of the shaft is a means of attaching a vise for holding an object such as a fly. However, Kretzmeir does not disclose a workstation with trays that are magnetically attached In U.S. Pat. No. 4,122,956, Hargrove discloses a mobile workstation with an additional tray that acts to hold tools and supplies, where the base has wheels and from the base a shaft is extended that holds the work space and tray, but does not disclose a workstation with trays that are magnetically attached.

In U.S. Pat. No. 2,120,571, Reichenstein discloses a fly tying station that comprises a base and a rod that extends from the base. A collection of arms can be attached to the rod including one for holding a vise and a magnifying glass. Also included is a tray for holding supplies. However, Reichenstein does not disclose a workstation with trays that are magnetically attached.

SUMMARY OF THE INVENTION

A multi-function workstation that provides a work surface upon which to work while also providing easy access to necessary materials through the use of a plurality of trays that are interchangeable, where the multi-function work station can be used for such tasks as tying flies, designing jewelry, or assembling or repairing projects. The multifunction workstation comprises a base with a center rod extending up from the base, as well as a plurality of shelves attached to the center rod, a plurality of trays, and a plurality of attachment points. Each of the plurality of trays are detachable from any of the plurality of shelves. The plurality of trays are also designed to have a plurality of functional components such as a flat surface, a bobbin holder, a closeable compartment, a shallow pan, a feather holder, where a feather holder is a mesh screen wherein the holes are small enough to prevent a feather from easily passing through but large enough for the feather to be pulled through when desired to be removed, a slot for inserting a tool, or a waste receptacle to make a workstation that also provides easy access to supplies. The attachment points allow the attachment of a plurality of tools to aid in working on projects.

In one preferred embodiment of the multifunction workspace, the multifunction workspace involves a base, center rod and only one of the plurality of shelves, the shelf. In this instance, the work surface that comprises the top portion of the shelf provides the user with an area to work. A plurality of trays can then be attached to the shelf and the plurality of functional components give easy access to the user of the items the user needs to construct his project.

In a second preferred embodiment of the multifunction workspace, the multifunction workspace involves a base, center rod and a plurality of shelves. In this instance, a plurality of trays can be attached to the plurality of shelves to store the components the worker may need to construct a project. Any one of the plurality of trays can then be easily removed from the second preferred embodiment of the multifunction workspace and attached to the first preferred embodiment of the multifunction workspace or the user can use the top most work surface on this preferred embodiment as a workspace.

BRIEF DESCRIPTION OF THE SEVERAL VIEWS OF THE DRAWING

FIG. 14 is an objective view of the sixth embodiment of the functional components for the plurality of trays indicating a slot for inserting tools;

FIG. 15 is an objective view of the seventh embodiment of the functional components for the plurality of trays indicating a waste receptacle; and FIG. 16 is an objective view of the first embodiment of the multifunction workstation indicating how a plurality of tools can be attached.

DETAILED DESCRIPTION OF THE INVENTION

Figure 1:
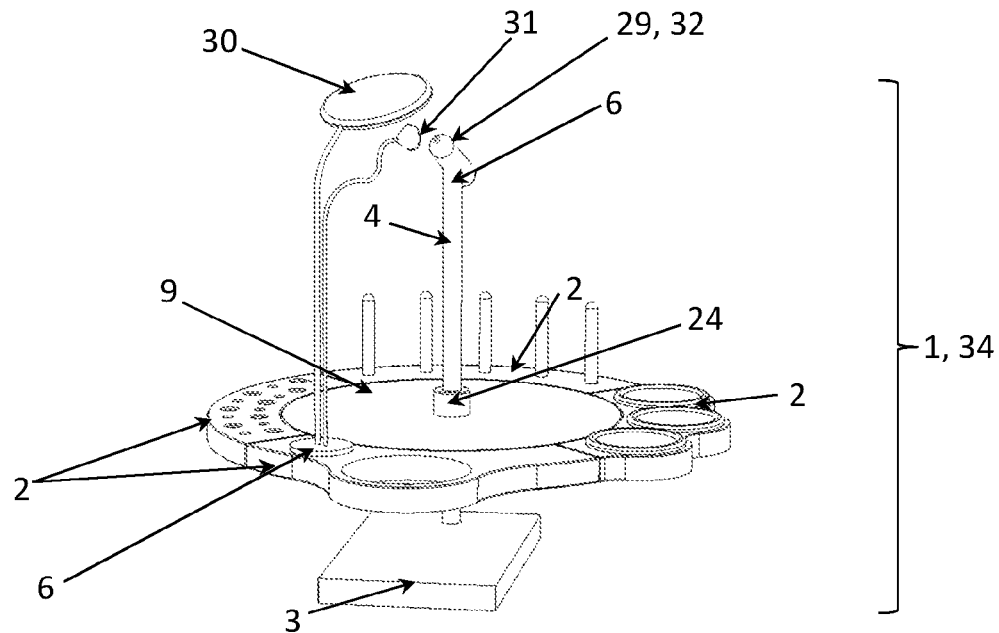
FIG. 1 is an objective view of the first embodiment of the multifunction work station displaying the base and the center rod, where the plurality of shelves is a single shelf, and which also displays a plurality of attached trays.
Figure 2:
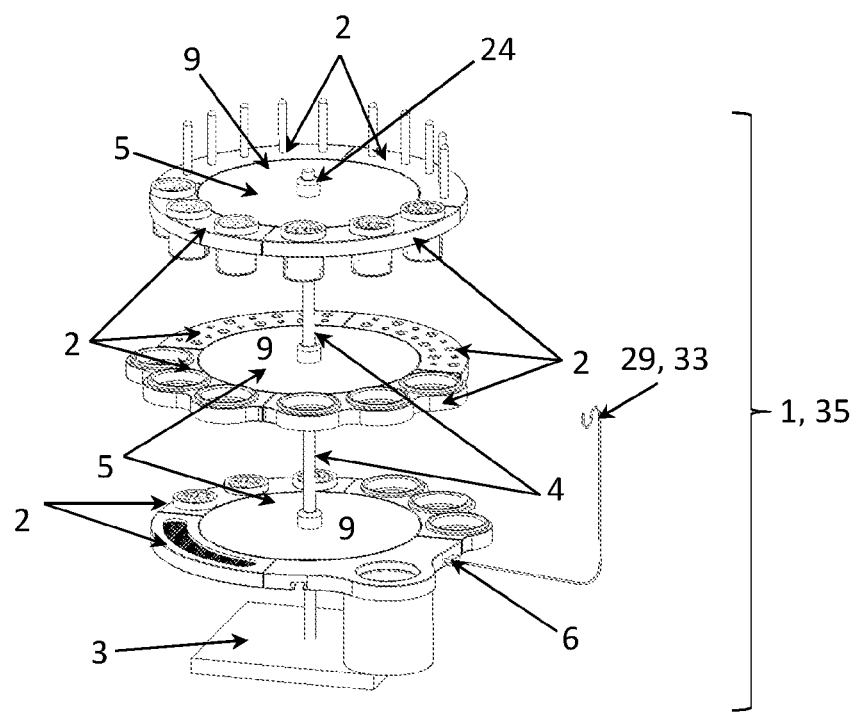
FIG. 2 is an objective view of the second embodiment of the multifunction work station displaying the base and the center rod, with a plurality of shelves and which also displays a plurality of attached trays.
Figure 3:
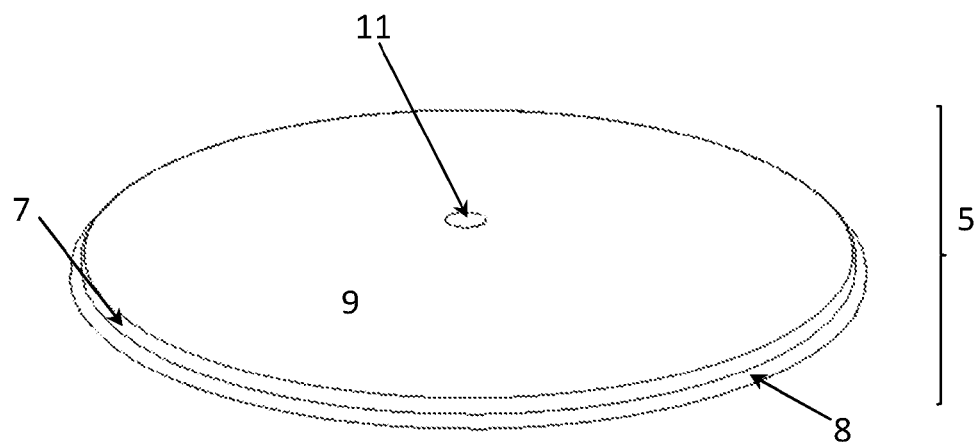
FIG. 3 is an objective view of the first embodiment of the plurality of shelves including the upper layer and lower layer, work surface, and the lower layer comprises a plate capable of having a plurality of magnets attach and detach, and the center hole.
Figure 4:
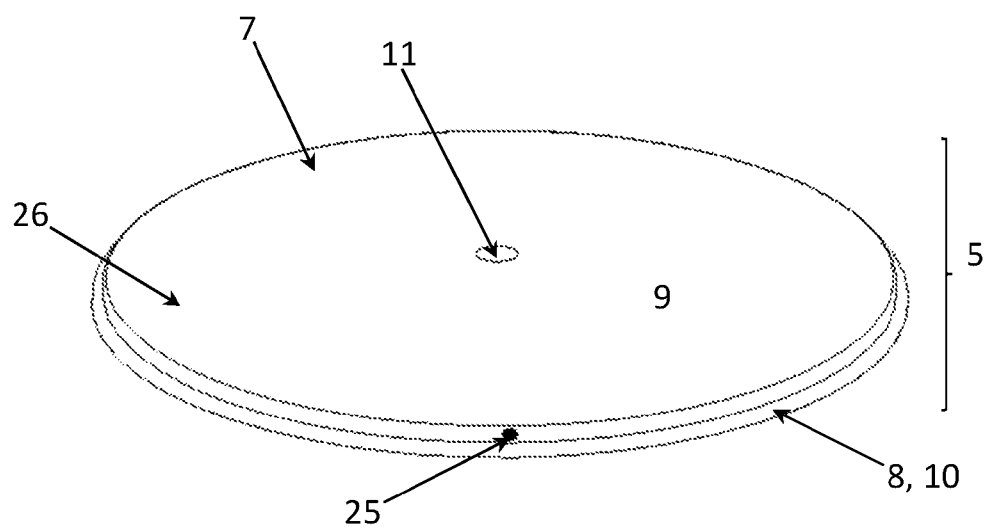
FIG. 4 is an objective view of the second embodiment of the plurality of shelves including the upper layer and lower layer, work surface, and the lower layer comprises a plate capable of having a plurality of magnets attach and detach, the center hole, and the plurality of support holes along the outside edge.
Figure 5:
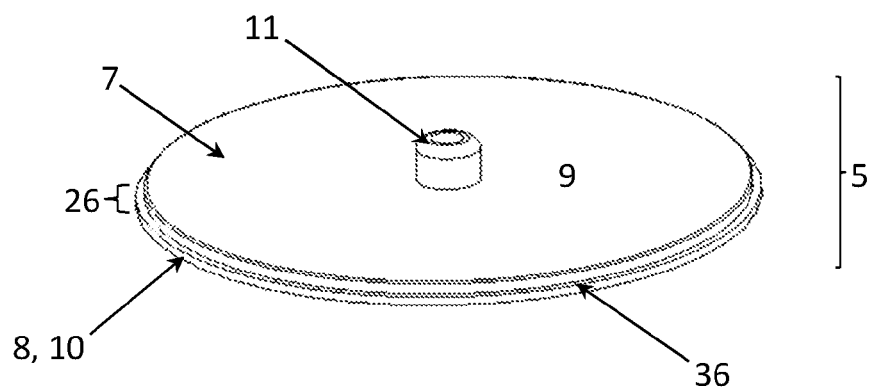
FIG. 5 is an objective view of the second embodiment of the plurality of shelves including the upper layer and lower layer, work surface, and the lower layer comprises a plate capable of having a plurality of magnets attach and detach, the center hole, and a grove portion outside edge.
Figure 6:
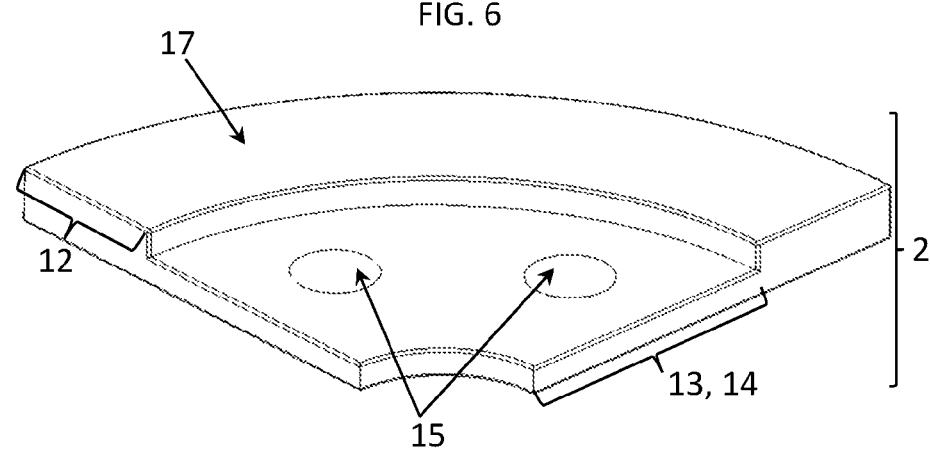
FIG. 6 is an objective view of the first embodiment of the plurality of trays including outer portion, inner portion, the base layer, and the plurality of magnets attached to the base layer.
Figure 7:
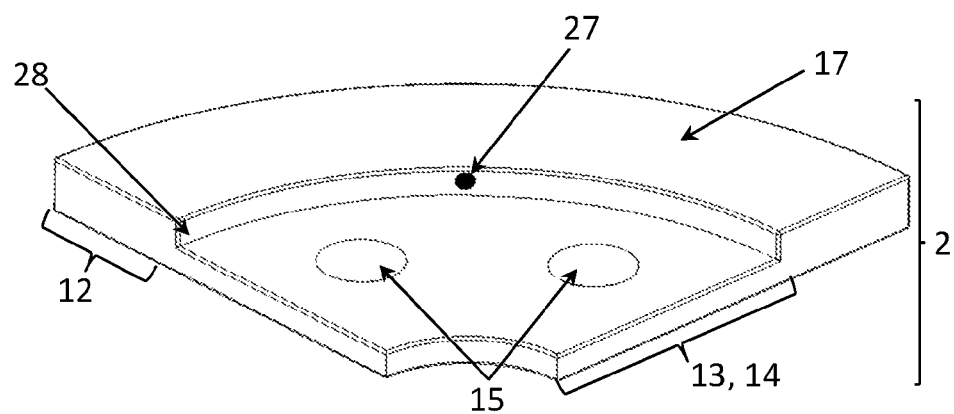
FIG. 7 is an objective view of the second embodiment of the plurality of trays including outer portion, inner portion, the base layer, the plurality of magnets attached to the base layer, and the attachment means extending from the inside edge of the outer portion.
Figure 8:
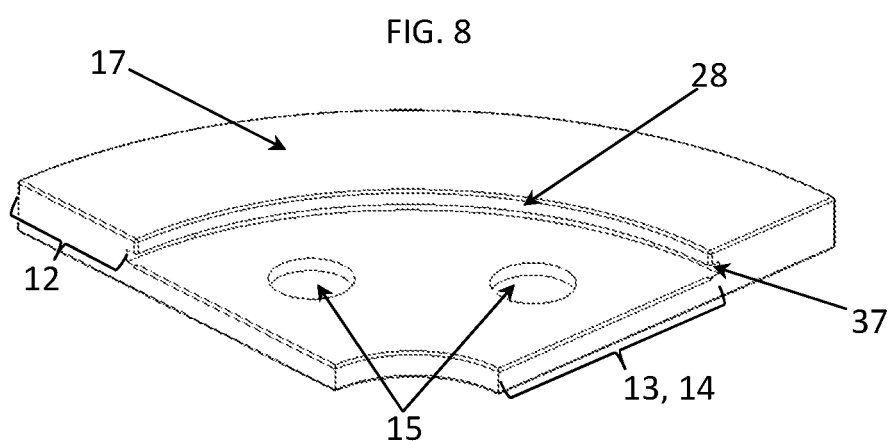
FIG. 8 is an objective view of the third embodiment of the plurality of trays including outer portion, inner portion, the base layer, the plurality of magnets attached to the base layer, and the grove portion of a tong and grove means along the inside edge of the outer portion.
Figure 9:
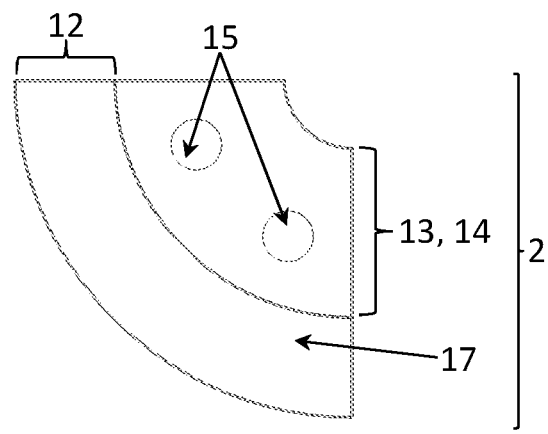
FIG. 9 is an objective view of the first embodiment of the functional components for the plurality of trays indicating a flat surface.
Figure 10:
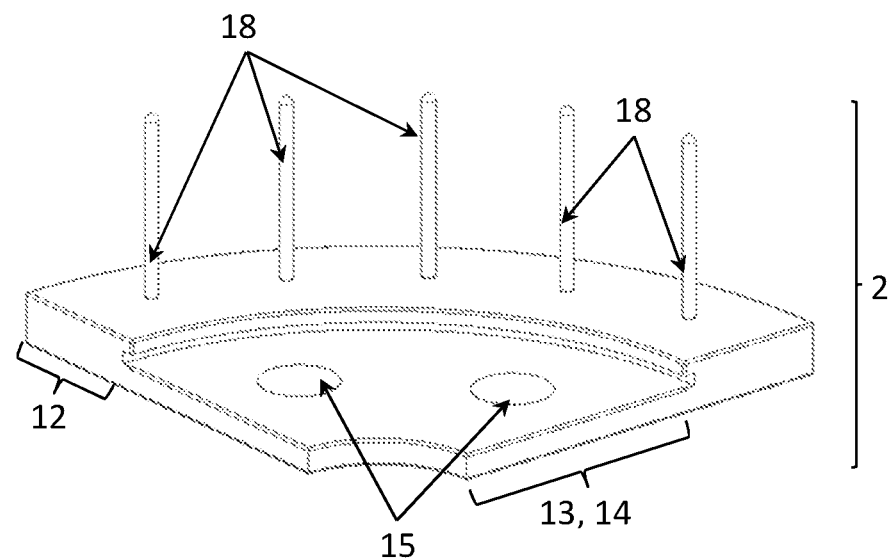
FIG. 10 is an objective view of the second embodiment of the functional components for the plurality of trays indicating a bobbin holder.
Figure 11:
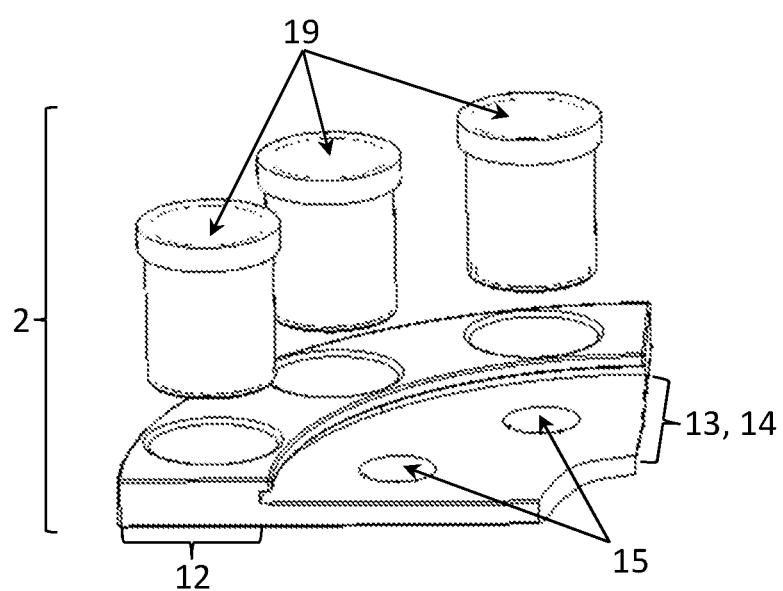
FIG. 11 is an objective view of the third embodiment of the functional components for the plurality of trays indicating a closeable compartment.
Figure 12:
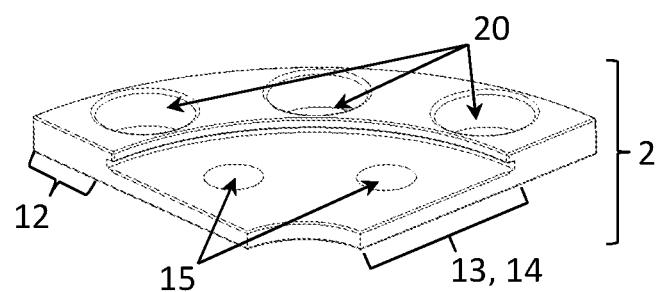
FIG. 12 is an objective view of the fourth embodiment of the functional components for the plurality of trays indicating a shallow pan.
Figure 13:
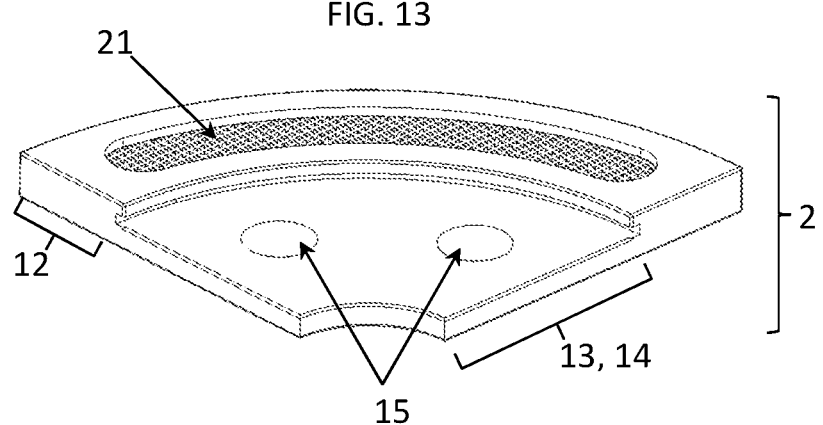
FIG. 13 is an objective view of the fifth embodiment of the functional components for the plurality of trays indicating a feather holder.

A multifunction workstation 1 that provides a work surface upon which to work while also providing easy access to necessary materials through the use of a plurality of trays 2 that are magnetically attached and interchangeable, where the multi-function work station can be used for such tasks as tying flies, designing jewelry, or assembling or repairing projects. The multifunction workstation 1 comprises a base 3, a center rod 4, a plurality of shelves 5, a plurality of trays 2, and a plurality of attachment points 6.

Each of the plurality of shelves 5 comprises two layers, an upper layer 7 and a lower layer 8 where the top portion of the upper layer 7 is a work surface 9, and the lower layer 8 comprises a plate 10 capable of having a plurality of magnets attach and detach. The bottom portion of the upper layer 7 is attached to the top portion of the lower layer 8 such that the exposed surfaces comprise the work surface 9 and the bottom portion of the lower layer 8. Each of said plurality of shelves 5 has a center hole 11 through lower layer 8 and through the upper layer 7, such that said center hole 11 passes through the center of the lower layer 8 and the center of the upper layer 7.

Each of said plurality of trays 2 has an outer portion 12 and an inner portion 13, where the inner portion 13 comprises a base layer 14 and a plurality of magnets 15 attached to said base layer 14 such that, when the base layer 14 is placed against the bottom portion of the lower layer 8 of one of the plurality of shelves 5 the plurality of magnets 15 act to attach the base layer 14 to the bottom portion of the lower layer 8 of the plurality of shelves 5. Once the base layer 14 is attached to bottom portion of the lower layer 8 of one of the plurality of shelves 5, the top portion of the outer portion 12 is co-planar with the work surface 9 of the plurality of shelves 5 to which it is attached. A plurality of trays 2 can be attached to one of the plurality of shelves 5 such that the plurality of trays 2 can completely and continuously surround the one of the plurality of trays 2. The plurality of trays 2 also comprise a plurality of functional components 16 including at least one of a flat surface 17, a bobbin holder 18, a closeable compartment 19, a shallow pan 20, a feather holder 21, where a feather holder is a mesh screen wherein the holes are small enough to prevent a feather from easily passing through but large enough for the feather to be pulled through when desired to be removed, a slot 22 for inserting a tool, or a waste receptacle 23.

The structure of the multifunction workstation 1 involves the center rod 4 being attached to and extending vertically from the base 3, where at least one of the plurality of shelves 5 is attached to the center rod 4 by the center rod 4 passing through the center hole 11 in the center of each plurality of shelves 5, where there is an attaching means 24 attached to each of the plurality of shelves 5 to hold each of the plurality of shelves 5 to the center rod 4. The plurality of trays 2 can be interchangeably attached and removed from the plurality of shelves 5. One method of attachment of the plurality of trays 2 to the plurality of shelves 5 involves the use of the plurality of magnets 15 by themselves.

A second method of attaching any of the plurality of trays 2 to the plurality of shelves 5 involves a plurality of support holes 25 along the outside edge 26 of any one of the plurality of shelves 5 and a plurality of attachment means 27 extending from the inside edge 28 of any of the outer portion 12 of the plurality of trays 2. The plurality of attachment means 27 extend from said inside edge 28 such that, when any one of said plurality of trays 2 is placed against the bottom portion of the lower layer 8 of one of the plurality of shelves 5, the plurality of attachment means 27 align with the plurality of support holes 25 and the plurality of attachment means 27 are fitted into the plurality of support holes 25 such that an additional method is now added to support each of the plurality to trays 2 to any of the plurality of shelves 5.

A third method of attaching any of the plurality of trays 2 to the plurality of shelves 5 involves a tong and grove means wherein a tong portion 36 is along the outside edge 26 of any one of the plurality of shelves 5 and a grove portion 37 extends from the inside edge 28 of any of the outer portion 12 of the plurality of trays 2. The grove portion 37 is along said inside edge 28 such that, when any one of said plurality of trays 2 is placed against the bottom portion of the lower layer 8 of one of the plurality of shelves 5, the grove portion 37 aligns with the tong portion 36 and the tong portion 36 is fitted into the grove portion 37 such that an additional method is now added to support each of the plurality to trays 2 to any of the plurality of shelves 5.

The plurality of attachment points 6 are located on at least one of the base 3, the center rod 4, or any one of the plurality of shelves 5. To any of the plurality of attachment points 6, a plurality of tools 29 can be attached. This plurality of tools 29 includes at least one of magnifying glass 30, a light source 31, a vice 32, or a spindle 33.

In the first preferred embodiment 34 of the multifunction workstation 1, the multifunction workstation 1 involves a base 3, center rod 4 and only one of the plurality of shelves 5, the shelf 34. In this instance, the work surface 9 that comprises the top portion of the shelf 34 provides the user with an area to work. A plurality of trays 2 can then be attached to the shelf 34 and the plurality of functional components 16 give easy access to the user of the items the user needs to construct his project.

In a second preferred embodiment 35 of the multifunction workstation 1, the multifunction workstation 1 involves a base 3, center rod 4 and a plurality of shelves 5. In this instance, a plurality of trays 2 can be attached to the plurality of shelves 5 to store the components the worker may need to construct a project. Any one of the plurality of trays 2 can then be easily removed from the second preferred embodiment of the multifunction workstation 1 and attached to the first preferred embodiment of the multifunction workstation 1 or the user can use the top most work surface 9 on this preferred embodiment as a workspace.

What is claimed:

1. A multifunction workstation that provides a work surface upon which to work while also providing easy access to necessary materials through the use of a plurality of trays that are interchangeable, wherein the multifunction workstation can be used for such tasks as tying flies, designing jewelry, or assembling or repairing projects comprising:

a base, a center rod, a plurality of shelves, a plurality of trays, and a plurality of attachment points;

wherein the center rod is attached to and extends vertically from the base;

wherein each plurality of shelves comprises two layers, an upper layer and a lower layer;

wherein the top portion of the upper layer is a work surface;

wherein the lower layer comprises a plate capable of having a plurality of magnets attach and detach;

wherein the bottom portion of the upper layer is attached to the top portion of the lower layer such that the exposed surfaces of the shelf comprise the work surface and the bottom portion of the lower layer;

wherein each of said plurality of shelves has a center hole through the lower layer and through the upper layer, such that said center hole passes through the center of the lower layer and the center of the upper layer;

wherein at least one of said plurality of shelves is attached to the center rod by the center rod passing through the center hole in the center of each plurality of shelves, where there is an attaching means attached to each of the plurality of shelves to hold each of the plurality of shelves to the center rod;

wherein each of said plurality of trays has an outer portion and an inner portion;

wherein the inner portion comprises a base layer and a plurality of magnets attached to said base layer such that, when the base layer is placed against the bottom portion of the lower layer of one of the plurality of shelves the plurality of magnets act to attach the base layer to the bottom portion of the lower layer of the plurality of shelves;

wherein once the base layer is attached to the bottom portion of the lower layer of one of the plurality of shelves, the top portion of the outer portion is co-planar with the top portion of the plurality of shelves to which the base layer is attached;

wherein a plurality of said trays can be attached to one of the plurality of shelves such that the plurality of trays can completely and continuously surround the one of the plurality of shelves.

2. The multifunction workstation of claim 1 wherein the plurality of trays additionally possess a plurality of functional components.

3. The multifunction workstation of claim 2 wherein the plurality of functional components comprise at least one of a flat surface, a bobbin holder, a closable compartment, a shallow pan, a feather holder, a slot for inserting a tool, or a waste receptacle.

4. The multifunction workstation of claim 1 wherein the plurality of attachment points are located on at least one of the base, the center rod, or any one of the plurality of shelves.

5. The multifunction workstation of claim 4 wherein a plurality of tools can be attached.

6. The multifunction workstation of claim 5 wherein the plurality of tools includes at least one of magnifying glass, a light source, a vice, or a spindle.

7. A multi-function workstation that provides a work surface upon which to work while also providing easy access to necessary materials through the use of a plurality of trays that are interchangeable, wherein the multifunction workstation can be used for such tasks as tying flies, designing jewelry, or assembling or repairing projects comprising:
   a base, a center rod, a plurality of shelves, a plurality of trays, and a plurality of attachment points;
   wherein the center rod is attached to and extends vertically from the base;
   wherein each plurality of shelves comprises two layers, an upper layer and a lower layer;
   wherein the top portion of the upper layer is a work surface;
   wherein the lower layer comprises a plate capable of having a plurality of magnets attach and detach;
   wherein the bottom portion of the upper layer is attached to the top portion of the lower layer such that the exposed surfaces of the shelf comprise the work surface and the bottom portion of the lower layer;
   wherein each of the plurality of shelves has an outside edge;
   wherein along the outside edge is a plurality of support holes;
   wherein each of said plurality of shelves has a center hole through the lower layer and through the upper layer, such that said center hole passes through the center of the lower layer and the center of the upper layer;
   wherein at least one of said plurality of shelves is attached to the center rod by the center rod passing through the center hole in the center of each plurality of shelves, where there is an attaching means attached to each of the plurality of shelves to hold each of the plurality of shelves to the center rod;
   wherein each of said plurality of trays has an outer portion and an inner portion;
   wherein the inner portion comprises a base layer and a plurality of magnets attached to said base layer such that, when the base layer is placed against the bottom portion of the lower layer of one of the plurality of shelves the plurality of magnets act to attach the base layer to the bottom portion of the lower layer of the plurality of shelves;
   wherein the outer portion of each of the plurality of trays has an inside edge;
   wherein a plurality of attachment means extend from said inside edge such that, when any one of said plurality of trays is placed against the bottom portion of the lower layer of one of the plurality of shelves, the plurality of attachment means align with the plurality of support holes and the plurality of attachment means are fitted into the plurality of support holes such that an additional method is now added to support each of the plurality to trays to any of the plurality of shelves;
   wherein once the base layer is attached to the bottom portion of the lower layer of one of the plurality of shelves, the top portion of the outer portion is co-planar with the top portion of the plurality of shelves to which the base layer is attached;
   wherein a plurality of said trays can be attached to one of the plurality of shelves such that the plurality of trays can completely and continuously surround the one of the plurality of shelves.

8. The multifunction workstation of claim 7 wherein the plurality of trays additionally possess a plurality of functional components.

9. The multifunction workstation of claim 8 wherein the plurality of functional components comprise at least one of a flat surface, a bobbin holder, a closable compartment, a shallow pan, a feather holder, a slot for inserting a tool, or a waste receptacle.

10. The multifunction workstation of claim 7 wherein the plurality of attachment points are located on at least one of the base, the center rod, or any one of the plurality of shelves.

11. The multifunction workstation of claim 10 wherein a plurality of tools can be attached.

12. The multifunction workstation of claim 11 wherein the plurality of tools includes at least one of magnifying glass, a light source, a vice, or a spindle.

13. A multi-function workstation that provides a work surface upon which to work while also providing easy access to necessary materials through the use of a plurality of trays that are interchangeable, wherein the multifunction workstation can be used for such tasks as tying flies, designing jewelry, or assembling or repairing projects comprising:
   a base, a center rod, a plurality of shelves, a plurality of trays, and a plurality of attachment points;
   wherein the center rod is attached to and extends vertically from the base;
   wherein each plurality of shelves comprises two layers, an upper layer and a lower layer;
   wherein the top portion of the upper layer is a work surface;
   wherein the lower layer comprises a plate capable of having a plurality of magnets attach and detach;
   wherein the bottom portion of the upper layer is attached to the top portion of the lower layer such that the exposed surfaces of the shelf comprise the work surface and the bottom portion of the lower layer;
   wherein each of the plurality of shelves has an outside edge;
   wherein along the outside edge is a tong portion;
   wherein each of said plurality of shelves has a center hole through the lower layer and through the upper layer, such that said center hole passes through the center of the lower layer and the center of the upper layer;
   wherein at least one of said plurality of shelves is attached to the center rod by the center rod passing through the center hole in the center of each plurality of shelves, where there is an attaching means attached to each of the plurality of shelves to hold each of the plurality of shelves to the center rod;
   wherein each of said plurality of trays has an outer portion and an inner portion;
   wherein the inner portion comprises a base layer and a plurality of magnets attached to said base layer such that, when the base layer is placed against the bottom portion of the lower layer of one of the plurality of shelves the plurality of magnets act to attach the base layer to the bottom portion of the lower layer of the plurality of shelves;

wherein the outer portion of each of the plurality of trays has an inside edge;

wherein there is a grove portion along said inside edge such that, when any one of said plurality of trays is placed against the bottom portion of the lower layer of one of the plurality of shelves, the tong portion aligns with the grove portion and the tong portion is fitted into the grove portion such that an additional method is now added to support each of the plurality to trays to any of the plurality of shelves;

wherein once the base layer is attached to the bottom portion of the lower layer of one of the plurality of shelves, the top portion of the outer portion is co-planar with the top portion of the plurality of shelves to which the base layer is attached;

wherein a plurality of said trays can be attached to one of the plurality of shelves such that the plurality of trays can completely and continuously surround the one of the plurality of shelves.

14. The multifunction workstation of claim 13 wherein the plurality of trays additionally possess a plurality of functional components.

15. The multifunction workstation of claim 14 wherein the plurality of functional components comprise at least one of a flat surface, a bobbin holder, a closable compartment, a shallow pan, a feather holder, a slot for inserting a tool, or a waste receptacle.

16. The multifunction workstation of claim 13 wherein the plurality of attachment points are located on at least one of the base, the center rod, or any one of the plurality of shelves.

17. The multifunction workstation of claim 16 wherein a plurality of tools can be attached.

18. The multifunction workstation of claim 17 wherein the plurality of tools includes at least one of magnifying glass, a light source, a vice, or a spindle.

* * * * *